United States Patent
Desai et al.

(10) Patent No.: US 7,346,477 B2
(45) Date of Patent: Mar. 18, 2008

(54) TESTING A STATION'S RESPONSE TO A REDUCTION IN WIRELESS SIGNAL STRENGTH

(75) Inventors: Mitesh K. Desai, Redmond, WA (US); David C. Harding, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 53 days.

(21) Appl. No.: 11/364,606

(22) Filed: Feb. 28, 2006

(65) Prior Publication Data
US 2007/0203672 A1 Aug. 30, 2007

(51) Int. Cl.
*G06F 19/00* (2006.01)

(52) U.S. Cl. ............... 702/189; 340/539.1; 340/539.11; 340/539.21; 340/853.2; 343/703; 455/115.1; 455/115.3; 455/226.1; 455/226.2; 702/127

(58) Field of Classification Search .............. 73/570, 73/584, 596, 602; 340/539.1, 539.11, 539.21, 340/853.2; 343/703; 455/115.1, 115.3, 226.1, 455/226.2; 702/66, 69, 127, 189
See application file for complete search history.

(56) References Cited

U.S. PATENT DOCUMENTS

| | | | | |
|---|---|---|---|---|
| 2,879,382 | A * | 3/1959 | Freen ..................... | 343/703 |
| 5,062,069 | A * | 10/1991 | Takasu et al. ........... | 702/120 |
| 5,361,402 | A * | 11/1994 | Grube et al. ............ | 455/67.11 |
| 6,668,160 | B2 | 12/2003 | Schmitt et al. ......... | 455/67.14 |
| 7,035,594 | B2 * | 4/2006 | Wallace et al. ......... | 455/67.12 |
| 7,146,142 | B1 * | 12/2006 | Raaf ........................ | 455/245.1 |
| 2001/0041538 | A1 * | 11/2001 | Schmitt et al. ......... | 455/67.4 |
| 2004/0103278 | A1 | 5/2004 | Abhishek et al. | |

FOREIGN PATENT DOCUMENTS

| | | | |
|---|---|---|---|
| DE | 4420448 C1 | * | 9/1995 |
| EP | 0 359 327 A2 | * | 3/1990 |

OTHER PUBLICATIONS

Desai et al: "Testing a Station's Response to Non-compliant Wireless Communication", U.S. Appl. No. 11/364,450, filed Feb. 28, 2006.*

Desai et al: "Testing a Station's Response to Wireless Commuincation in Different Modes", U.S. Appl. No. 11/364,605, filed Feb. 28, 2006.*

(Continued)

*Primary Examiner*—Edward R Cosimano
(74) *Attorney, Agent, or Firm*—Wolf, Greenfield & Sacks, P.C.

(57) ABSTRACT

Techniques for testing a station, such as a wireless-enabled device, are described. A first method relates to evaluating a station configured to communicate with at least one access point. Another device is controlled to communicate wirelessly with the station by transmitting a wireless signal. The first device is controlled, via software, to reduce the strength of the wireless signal, and the response of the station is evaluated. A second method relates to evaluating a station configured to communicate in accordance with a wireless communication standard. Another device is controlled to engage in wireless communication with the station in a manner that does not comply with the wireless communication standard, and the station's response is evaluated. A third method relates to evaluating a station that can be configured to communicate in different communication modes. Another device is configured and re-configured, via software, to communicate wirelessly with the station in different communication modes, and the response of the station is evaluated.

20 Claims, 8 Drawing Sheets

OTHER PUBLICATIONS

Azimuth Systems, Inc., "Azimuth W-Series WLAN Test Platform," .azimuth.net/index.asp?p=79, printed on Feb. 27, 2006, pp. 1-2.

P. Callahan, "Swarm logic for wireless net management," EE Times, Dec. 31, 2003, pp. 1-4.

* cited by examiner

TESTING A STATION'S RESPONSE TO A REDUCTION IN WIRELESS SIGNAL STRENGTH

BACKGROUND

1. Technical Field

The invention relates to evaluating a station by communicating wirelessly with the station.

2. Discussion of Related Art

Wireless communication technologies enable devices such as laptop computers and access points to communicate wirelessly by sending and receiving radio messages. A laptop computer may be equipped with a wireless network card that enables the laptop computer to communicate wirelessly with an access point. The laptop computer may also have a software driver that enables the laptop computer to interface with the wireless network card. To verify that the driver and wireless network card function appropriately, they may be subjected to testing.

For example, the manufacturer of the wireless network card may wish to verify that the wireless network card sends and receives data in a way that meets a particular protocol, specification or standard, such as IEEE standard 802.11. As another example, the manufacturer may wish to verify that a driver developed for the wireless network card handles data appropriately.

Figure 1:
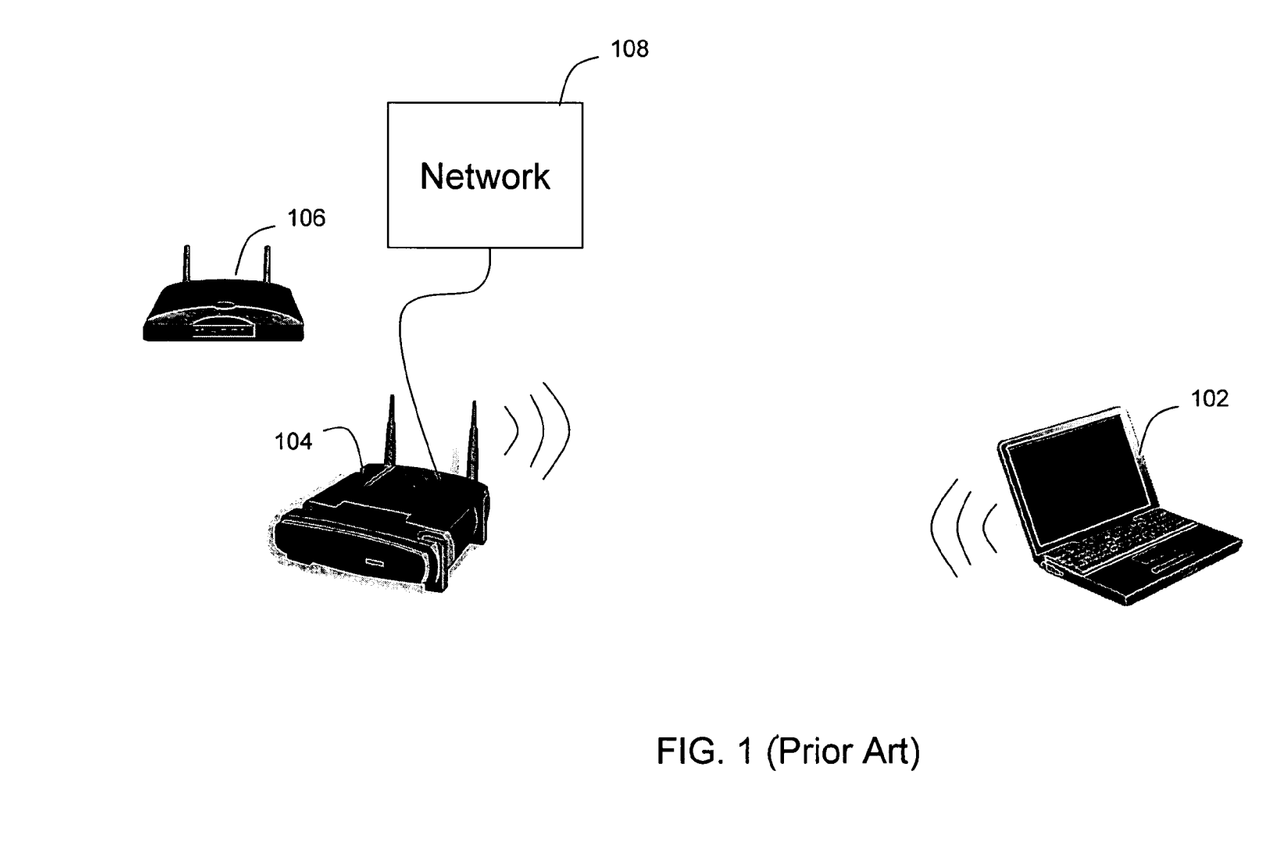
FIG. 1 is a diagram illustrating an example of a test infrastructure that may be used to test a station according to prior art techniques.

To verify that the wireless network card and driver function appropriately, the manufacturer may subject them to tests using a variety of access points. FIG. 1 is a diagram illustrating an example of a test infrastructure that may be used to test a station according to prior techniques. FIG. 1 illustrates an example of a station 102, an access point 104, an access point 106 and a network 108.

Station 102 may be tested to verify that it works properly when communicating wirelessly with an access point. To test station 102, access point 104 may be manually configured by a technician to communicate with station 102. Access point 104 is configured to exchange wireless messages with station 102. The station's ability to communicate wirelessly is tested by evaluating the response of station 102 to wireless communications with access point 104.

Once station 102 has been tested for communications with access point 104, the technician manually sets up a different type of access point, e.g., access point 106. Station 102 is then tested by exchanging wireless communications with access point 106. To verify that station 102 will function properly in a variety of situations, it may be tested by engaging in wireless communication with several different types of access points. As new access points become available on the market it may be necessary to obtain one of the new access points so that the station 102 can be tested against it.

In some wireless network environments, more than one access point may be available to communicate with a laptop computer. For example, several wireless access points may be set up at different locations in an office to provide wireless access across a broader area than could be covered by a single access point. As the laptop computer "roams" within the office or other environment, it may move out of the range of one access point and into the range of another access point, and the laptop computer should switch between access points.

A wireless network card and driver may be tested to verify the ability of the laptop to switch from communicating with one access point to another access point when the first access point goes out of range. One known way of testing this ability is to set up two access points in the vicinity of a laptop computer with the wireless network card and driver. The laptop may initially be in communication with one of the access points. Communications with the first access point may then be disrupted by enclosing the first access point in a metal cage, and the ability of the laptop to switch from communicating with the first access point to the second access point may be tested.

SUMMARY

The Applicants have appreciated that prior methods of testing a station may be cumbersome and time consuming. For example, to verify that a station functions properly in a variety of situations, a technician may need to test the station with several different types of access points, and may need to configure each access point manually.

The Applicants have further appreciated that testing the station using one or more programmable devices may facilitate station testing. Testing a station using a programmable device may enable efficiently testing the station's ability to communicate with several different types of access points, as the programmable device may be configured to communicate wirelessly with the station in different modes, so that the programmable device may function as a variety of different types of access points and facilitate evaluating a station's response to a variety of different communication modes.

The Applicants have also appreciated that it may be desirable to test a station's ability to handle receiving wireless communications that do not comply with the communication standard being employed. It may be desirable, for example, to ensure that the station functions properly if it receives a bad packet. To test the station in these types of scenarios, a programmable device may be controlled to communicate wirelessly with the station in a manner that does not comply with the communication standard, and the station's response to these non-compliant communications may be evaluated.

The Applicants have further appreciated that it may be desirable to facilitate testing a station's ability to handle a reduction in signal strength from an access point. For example, the station may be evaluated to see if it takes appropriate action, e.g., switching from communicating with an access point that has a weak signal to another access point that has a stronger signal. Applicants have appreciated that prior methods of testing a station's ability to handle the weakening of a signal may be cumbersome and expensive due to the need for specialty test hardware and procedures, e.g., testing using a metal cage. To facilitate this type of testing, a programmable device may be controlled to reduce the strength of the signal that is transmitted, and the response of the station to the reduction in signal strength may be evaluated.

One embodiment is directed to a method of evaluating a station configured to communicate with at least one access point in accordance with a wireless communication standard. A first device is controlled to engage in wireless communication with the station in a manner that does not comply with the wireless communication standard. The manner in which the station responds to the wireless communication that does not comply with the communication standard is evaluated.

Another embodiment is directed to at least one computer-readable medium having computer-executable instructions encoded thereon that, when executed, perform acts of a method of evaluating a station configured to communicate with at least one access point in accordance with a wireless communication standard. A first device is controlled to engage in wireless communication with the station in a manner that does not comply with the wireless communication standard. The manner in which the station responds to the wireless communication that does not comply with the communication standard is evaluated.

Another embodiment is directed to a method of evaluating a station that can be configured to communicate with an access point of a first type that communicates according to a first communication mode and an access point of a second type that communicates according to a second communication mode. The second communication mode differs from the first communication mode. A first device is configured, via software, to communicate wirelessly in the first communication mode. Operation of the station in response to the first device communicating wirelessly in the first communication mode is evaluated. The first device is re-configured, via software, to communicate wirelessly in a second communication mode. Operation of the station in response to the first device communicating wirelessly in the second communication mode is evaluated.

Another embodiment is directed to at least one computer-readable medium having computer-executable instructions encoded thereon that, when executed, perform a method of evaluating a station. The station can be configured to communicate with an access point of a first type that communicates according to a first communication mode and an access point of a second type that communicates according to a second communication mode that differs from the first communication mode. A first device is configured, via software, to communicate wirelessly in the first communication mode. Operation of the station in response to the first device communicating wirelessly in the first communication mode is evaluated. The first device is re-configured, via software, to communicate wirelessly in a second communication mode. Operation of the station in response to the first device communicating wirelessly in the second communication mode is evaluated.

Yet another embodiment is directed to a method of evaluating a station configured to communicate with at least one access point. A first device is controlled to communicate wirelessly with the station by transmitting a wireless signal having a first wireless signal strength. The first device is controlled, via software, to reduce the first wireless signal strength. The method also includes evaluating how the station responds to a reduction in the first wireless signal strength.

A further embodiment is directed to at least one computer-readable medium having computer-executable instructions encoded thereon that, when executed, perform acts of a method of evaluating a station configured to communicate with at least one access point. A first device is controlled to communicate wirelessly with the station by transmitting a wireless signal having a first wireless signal strength. The first device is controlled, via software, to reduce the first wireless signal strength. The method also includes evaluating how the station responds to a reduction in the first wireless signal strength.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The Applicants have appreciated that conventional techniques for testing a station that require manually configuring multiple access points for testing may be time consuming and cumbersome. The Applicants have further appreciated that conventional techniques do not enable testing a station's ability to handle non-compliant communications for the wireless standard being employed, e.g., IEEE standard 802.11.

In one embodiment, a controllable device may be controlled to engage in wireless communication with a station in a manner that does not comply with a wireless communication standard, e.g., IEEE standard 802.11, by which the station is configured to communicate. The response of the station to the wireless communication may be evaluated. In this respect, during use of a station in the field, an access point may (e.g., due to a malfunction) inadvertently send a communication that does not comply with the standard by which the access point is communicating with the station. In addition, radio interference in the field may distort a signal sent by an access point such that the station receives a distorted signal. Communicating wirelessly with a controllable device in a manner that does not comply with the communication standard may facilitate evaluating a station in a variety of real-world scenarios which the station may be anticipated to encounter.

In another embodiment, testing a station may be facilitated through the use of a device that can be configured to communicate wirelessly in more than one mode. The configurable device may communicate wirelessly with a station to evaluate the station's response to communications in different modes. Initially, the configurable device may be configured to communicate wirelessly in a first communication mode. Operation of the station in response to the first device communicating wirelessly in the first communication mode may be evaluated. The first device may then be re-configured, e.g., via software, to communicate wirelessly in a second communication mode. Operation of the station in response to the first device communicating wirelessly in the second communication mode may be evaluated. The configurable device may thus emulate the operation of multiple different types of access points.

In yet another embodiment, a controllable device may be controlled to evaluate a station's ability to manage the weakening of a signal received from an access point. For example, a controllable device may be controlled to communicate wirelessly with the station by transmitting at a certain signal strength. The device may be controlled, e.g., via software, to reduce the signal strength, so that the response of the station to the reduction in the signal strength may be evaluated. Among other circumstances, the station's ability to switch from communicating with a weakly transmitting device to another device, e.g., a different access point having a stronger signal, may be evaluated. Such a circumstance can occur in the field if the station is mobile and moving so that the station should switch from one access point to another.

The embodiments of the invention discussed above can be implemented any of numerous ways, and none is limited to any particular manner of implementation. Examples of ways in which the embodiments of the invention can be implemented are described below merely for illustrative purposes, as numerous other implementations are possible.

Figure 2:
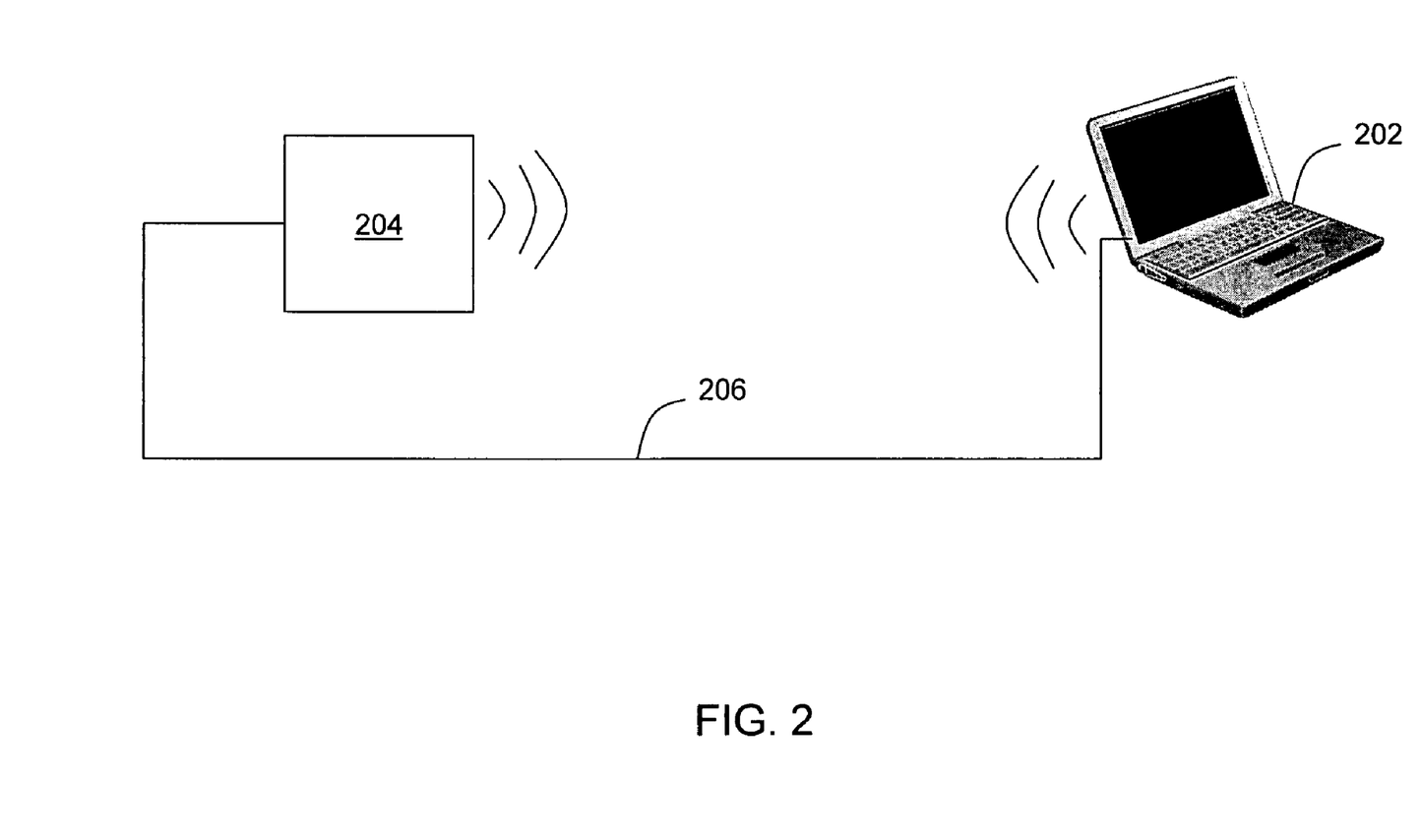
FIG. 2 is a diagram illustrating an example of a test infrastructure that may be used for evaluating a station according to some embodiments of the invention.

FIG. 2 is a diagram illustrating an example of a test infrastructure that may be used for evaluating a station according to some embodiments of the invention. FIG. 2 illustrates an example of a station 202, a device 204, and a control channel 206.

Station 202 may be a device configured to communicate wirelessly with at least one access point, such as a wireless router, or any other suitable device configured to function as an access point. Station 202 may be, for example, a laptop computer, a personal digital assistant (PDA) or any other wireless-enabled device that is configured to communicate wirelessly with an access point. Station 202 may include a wireless network card capable of communicating wirelessly according to at least one protocol, such as IEEE standard 802.11 and/or other protocols. Alternatively, or in addition to a wireless network card, station 202 may be in communication with a device that communicates wirelessly with device 204. For example, rather than being equipped with a wireless network card, station 202 may be in communication (e.g., through a universal serial bus (USB), parallel port, RJ-45 port, FireWire or other suitable connection) with a device capable of communicating wirelessly with device 204 to create a wireless interface for the station 202.

Device 204 may be any type of device suitable for communicating wirelessly with station 202. Device 204 may be, for example, a laptop computer, a personal digital assistant (PDA) or any other wireless-enabled device. Device 204 may include a wireless network card capable of communicating wirelessly according to at least one protocol, such as IEEE standard 802.11 and/or other protocols. Alternatively, or in addition to a wireless network card, device 204 may be in communication with a device that communicates wirelessly with station 202. For example, rather than being equipped with a wireless network card, device 204 may be in communication (e.g., through a universal serial bus (USB), parallel port, RJ-45 port, FireWire or other suitable connection) with a device capable of communicating wirelessly with station 202 to create a wireless interface for device 204.

Control channel 206 may be a communication channel that enables station 202 and device 204 to communicate via a different communication path than the wireless communication path being tested. In one embodiment, control channel 206 may include a wired connection between station 202 and device 204, although control channel 206 is not limited in this respect.

Figure 3:
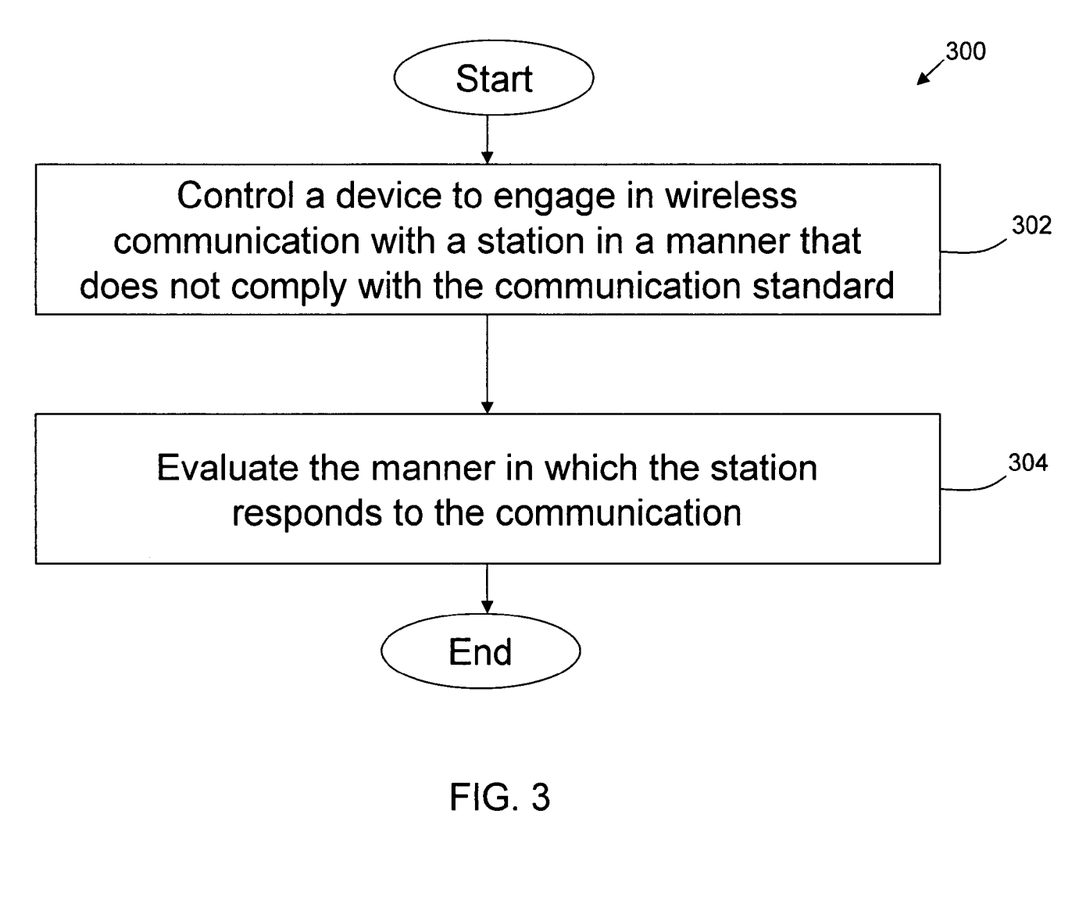
FIG. 3 is a flowchart illustrating an example of a method of evaluating a manner in which a station responds to a wireless communication that does not comply with the communication standard, in accordance with some embodiments of the invention.

FIG. 3 is a flowchart illustrating an example of a method 300 of evaluating a station configured to communicate with at least one access point using a wireless communication standard in accordance with one embodiment of the invention. Method 300 enables evaluating a station's ability to handle communications that do not comply with at least one wireless communication standard for which it is configured.

In act 302, device 204 is controlled to engage in wireless communication with the station in a manner that does not comply with the wireless communication standard. For example, device 204 may be controlled to send a bad packet, e.g., a packet that does not comply with the communication standard. As another example, device 204 may be controlled to deny a connection request sent from the station 202 even though the appropriate action under the wireless communication standard may be to allow the connection with the station 202. The device 204 may be controlled to act in any other manner that deviates from the wireless communication standard, e.g., in ways in which it is anticipated that an access point may behave in a real-world station usage scenario, as the embodiment shown in FIG. 3 is not limited in this respect. As a further example, device 204 may be controlled not to respond to a communication sent by station 202, even though the appropriate action under the wireless communication standard may be to send a response.

The behavior of device 204 may be controlled internally in any suitable manner, e.g., via a software layer executing on device 204, as will be discussed in further detail below. The controllable aspect (e.g., a software layer) of device 204 may be controlled externally (e.g., by station 202 or another device) or internally by software that runs on device 204.

In act 304, the manner in which the station 202 responds to the wireless communication that does not comply with the communication standard is evaluated. Any suitable component(s) associated with the station 202 may be evaluated, as the embodiment of the invention shown in FIG. 3 is not limited in this respect. For example, station 202 may include a wireless network adapter and a software driver configured to interface with the wireless network adapter, as discussed above. The manner in which the wireless network adapter and/or the software driver responds to the non-compliant wireless communication may be evaluated in act 304.

One or more types of evaluation may be performed, and the invention is not limited to any particular type of evaluation. For example, actions taken by the station 202 in response to the non-compliant communications may be recorded, and may be evaluated by comparing the actions to a list of actions that should have been performed. However, the actions taken by station 202 need not necessarily be recorded, and the station 202 may be evaluated directly without recording the actions taken. As another example, a report may be generated that describes the response of the station and/or or modules associated with the station. Such a report may be suitable for a human to comprehend and determine whether the station has passed a test, although the invention is not limited in this respect as the evaluation could be performed automatically (e.g., by a software program).

As another example, statistics may be compiled based on the actions that are performed by the device. For example, the percentage of tests that station 202 passes may be calculated, however, the invention is not limited as to the type or number of statistics that are compiled, and statistics need not be compiled at all.

Evaluation may be performed by a software and/or hardware module on or coupled to the station 202. However, evaluation need not be performed by station 202, and can be performed by device 204 or any other suitable device. In addition, the entire evaluation need not be performed by any one device, as portions thereof may be performed by multiple devices and/or multiple devices can perform the evaluation in parallel.

Method 300 may be performed by at least one device such as station 202, device 204 and/or any other suitable device. The acts of method 300 may be performed serially or concurrently, as the embodiment of the invention shown in FIG. 3 is not limited in this respect. Although method 300 has been described as including acts 302 and 304, in some circumstances additional acts may be performed. For example, device 204 and/or station 202 may control the test sequence by sending and/or receiving at least one command, however, the invention is not limited in this respect, as any suitable additional acts may be performed to control the test in any suitable way, and additional acts need not necessarily be performed.

Figure 4:
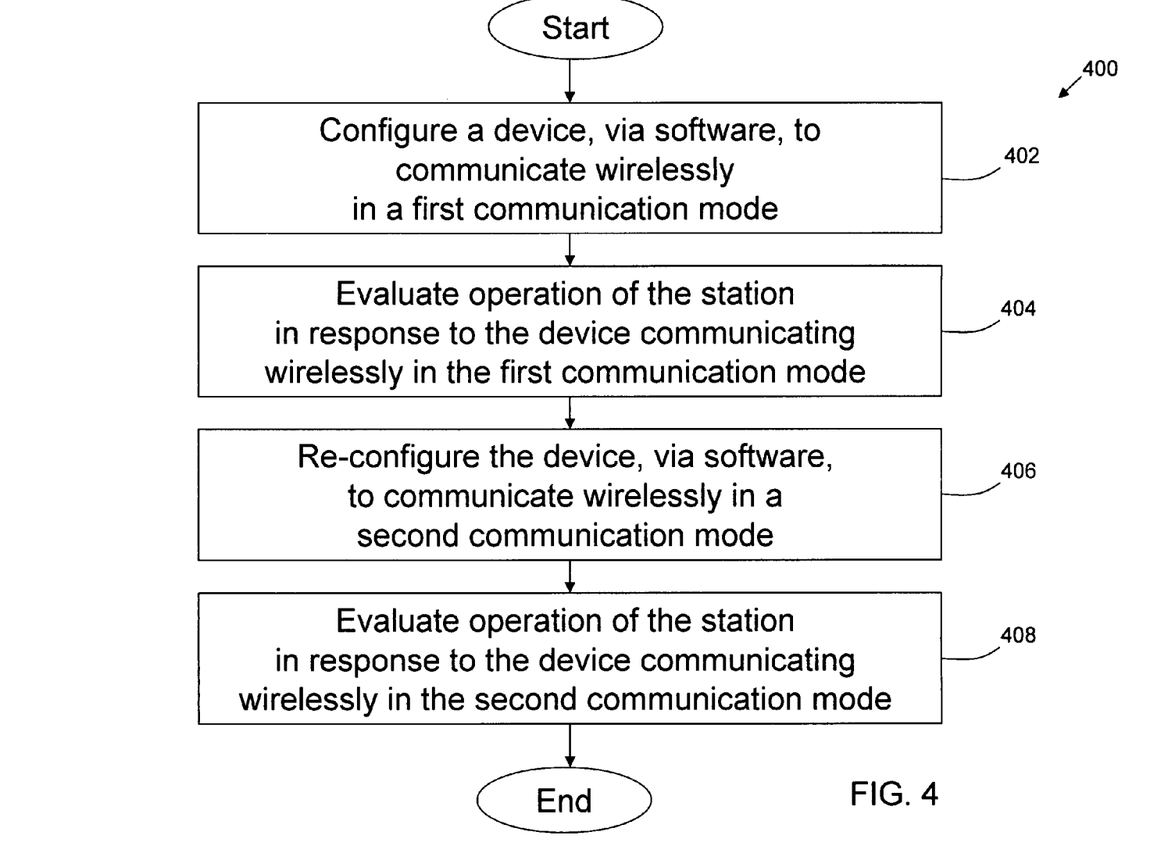
FIG. 4 is a flowchart illustrating an example of a method of evaluating a station that is configured to communicate with an access point of a first type and an access point of a second type different from the first type, in accordance with some embodiments of the invention.

FIG. 4 is a flowchart illustrating an example of a method 400 of evaluating a station that can be configured to communicate with an access point of a first type and an access point of a second type. The access point of the first type may communicate according to a first communication mode (e.g., protocol) and the access point of a second type may communicate according to a second communication mode that differs from the first communication mode. Method 400 may enable efficiently evaluating a station's ability to communicate with multiple different types of access points.

In act 402, device 204 may be configured, e.g., via software, to communicate wirelessly in the first communication mode. For example, device 204 may be configured to communicate in a mode that corresponds to the way that access point 104 (FIG. 1) communicates. Device 204 may be configured via software that may be running on device 204, station 202 and/or an additional device. If device 204 is configured via software running on station 202, control signals may be sent via control channel 206 (or any other suitable communication network) from station 202 to device 204. The control signals my configure device 204 to operate in the first communication mode.

In act 404, operation of the station in response to the device communicating wirelessly in the first communication mode is evaluated. Evaluation may be performed in any suitable way, including any of the ways discussed above with respect to evaluation act 304 in connection with method 300, as the embodiment of the invention shown in FIG. 4 is not limited in this respect.

In act 406, the first device may be re-configured, e.g., via software, to communicate wirelessly in a second communication mode. For example, device 204 may be configured to communicate in a mode that corresponds to the way that access point 106 (FIG. 1) communicates. In one embodiment, the first device may be re-configured via software that runs on station 202, device 204 or any other suitable device. The re-configuration may be performed automatically, e.g., without human intervention, or may not performed automatically. If the re-configuration is performed automatically, a software layer running on one or more devices, e.g., station 202, device 204 and/or an additional device, may perform the re-configuration in response to determining, for example, that act 404 and/or act 402 is complete. If the reconfiguration is not performed automatically, human intervention may trigger the reconfiguration. For example, a human may recognize that act 404 and/or 402 is complete, and may take action (e.g., pressing a button on station 202 and/or device 204) that causes the re-configuration to be performed.

In act 408, operation of the station in response to the first device communicating wirelessly in the second communication mode may be evaluated. As with act 404, evaluation may be performed in any suitable way, including any of the ways discussed above with respect to evaluation act 304 in connection with method 300, as the embodiment of the invention shown in FIG. 4 is not limited in this respect. The evaluation performed in act 408 may be performed in the same way as the evaluation performed in act 404, or may performed in a different way.

Method 400 may be performed by any suitable device, such as station 202, device 204 and/or an additional device. Although method 400 has been described as including acts 402, 404, 406 and 408, additional acts may be performed. For example, a device may be re-configured (either automatically or in response to human action) to communicate wirelessly in additional modes and the station's operation in response may be evaluated. The acts of method 400 need not necessarily be performed in the order described above. For example, acts 402 and 406 of configuring the device and communicating wirelessly both may be performed before either of acts 404 and 408 of evaluating, such that data that is stored may be analyzed at a later time.

Figure 5:
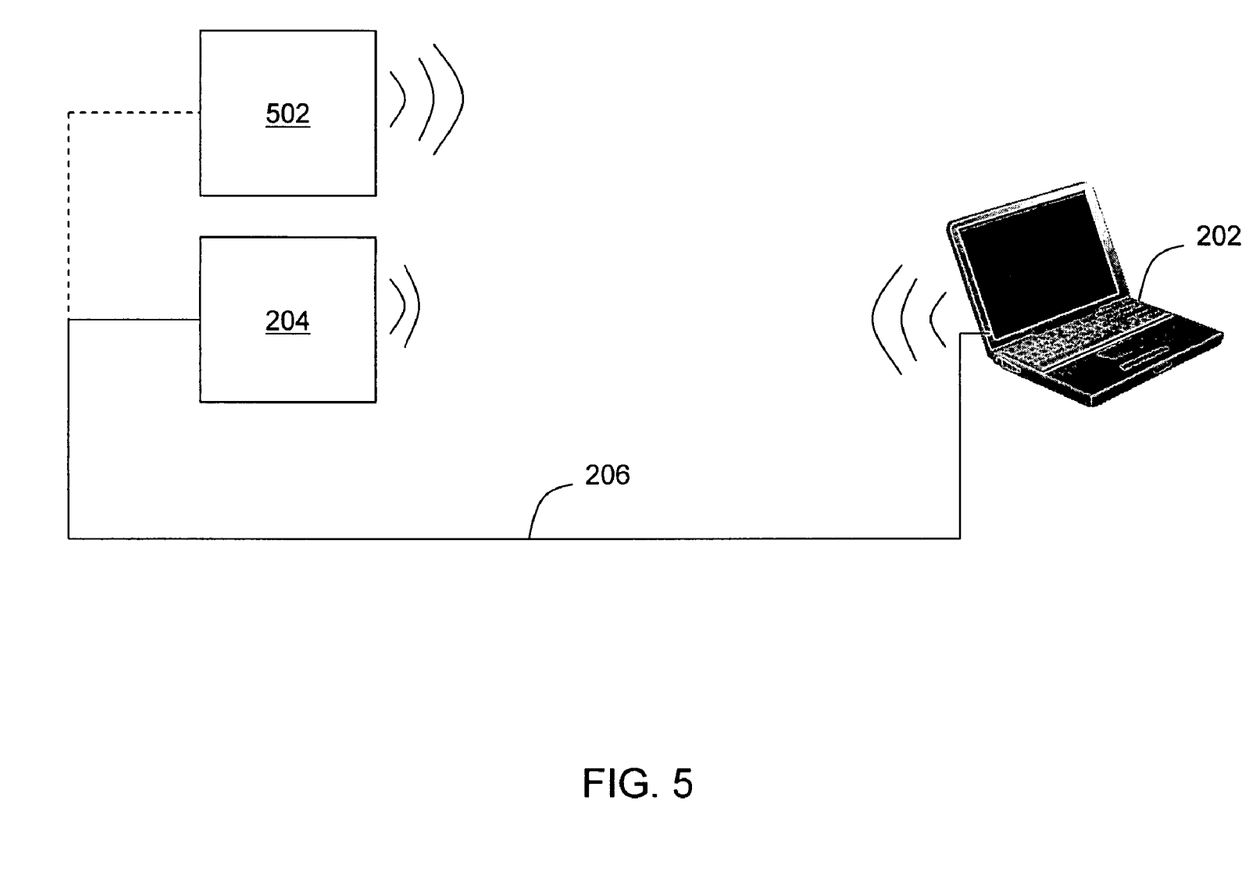
FIG. 5 is a diagram illustrating an example of a test infrastructure that may be used for evaluating a station's response to a reduction in a device's wireless signal strength, in accordance with some embodiments of the invention.

FIG. 5 is a diagram illustrating an example of a test infrastructure that may be used for evaluating a station's response to a reduction in a device's wireless signal strength. FIG. 5 illustrates an example of a station 202, a first device 204, a second device 502, and a control channel 206 that couples the first device 204 and the second device 502 to the station 202. First device 204 and second device 502 may both send and receive wireless signals to communicate with station 202.

Second device 502 may be any type of device suitable for communicating wirelessly with station 202, including any of the types of devices discussed above with respect to device 204. Second device 502 may be the same type of device as first device 204 or may be a different kind of device, as the invention is not limited in this respect. Second device 502 may communicate wirelessly with station 202, and may be coupled to control channel 206 so that the behavior of second device 502 can be controlled, however, second device 502 need not necessarily be controlled.

If second device 502 is not controlled, it need not be coupled to station 202 by control channel 206 (or any other control channel) and need not be coupled to first device 204 at all. If second device 502 is controlled, it may be controlled by first device 204, station 202 and/or an additional device via control channel 206 or a different control channel. Second device 502 may be controlled via the same channel (e.g., control channel 206) through which first device 204 is controlled, or by a different control channel, as the invention is not limited in this respect. Second device 502 may be controlled by the same device that controls first device 204, e.g., station 202, or by a different device.

Control channel 206 may be a communication channel that enables station 202, first device 204 and second device 502 to communicate via a different communication path than the wireless communication path being tested. In one embodiment, control channel 206 may include a wired connection between station 202, first device 204, and second device 502, although control channel 206 is not limited in this respect.

Figure 6:
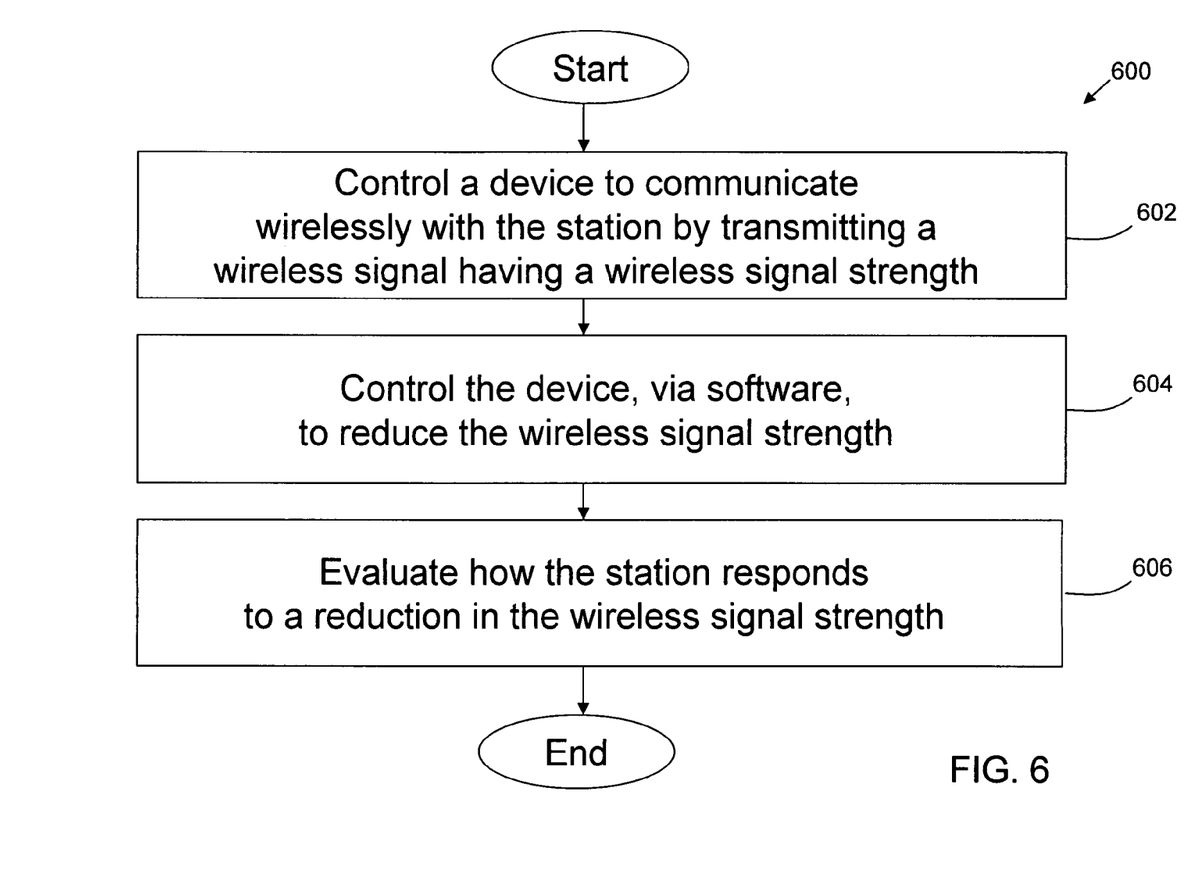
FIG. 6 is a flowchart illustrating an example of a method of evaluating a station that includes evaluating how the station responds to a reduction in the first wireless signal strength, in accordance with some embodiments of the invention.

FIG. 6 is a flowchart illustrating an example of a method 600 of evaluating how a station responds to a reduction in wireless signal strength. Method 600 may enable testing how a station would respond in the field when the station is in motion and moves into the range of an access point with a stronger signal than an access point with which it is communicating.

In act 602, device 204 may be controlled to communicate wirelessly with the station 202 by transmitting a wireless signal having a first wireless signal strength. For example, device 204 may be controlled in any of the ways discussed above or in any other suitable way.

In act 604, device 204 may be controlled, e.g., via software, to reduce the wireless signal strength. This can be done in any suitable way. For example, device 204 may include, or be in communication with, a wireless network adapter capable of changing the strength of the wireless signal it transmits. An example of a suitable wireless network adapter is a wireless network adapter available from RealTek (of Hsinchu, Taiwan). The strength of the wireless signal may be changed via one or more APIs (application program interfaces) associated with the wireless network card. In one embodiment, the strength of the wireless signal may be controlled by station 202 via control channel 206, however, the invention is not so limited.

In act 606, the response of the station to the reduction in the wireless signal strength may be evaluated. For example, an appropriate action for the station 202 may be to switch from communicating wirelessly with device 204 to communicating wirelessly with device 502 once the strength of the signal transmitted by device 204 reaches a particular threshold. One example of a threshold may be the signal strength at which station 202 receives a stronger signal from device 502 than from device 204. Other suitable evaluations may be performed, as the embodiment directed to evaluating how a station handles a reduction in signal strength is not limited in this respect. Evaluation may be performed in any suitable way, including any of the ways discussed above with respect to method 300.

Method 600 may be performed by a device such as station 202, device 204, device 502 and/or any other suitable device. Although method 600 has been described as including acts 602, 604 and 606, additional acts may also be performed. In some circumstances, acts of method 600 may be performed concurrently to other acts. The acts of method 600 need not necessarily be performed in the order described above.

Figure 7:
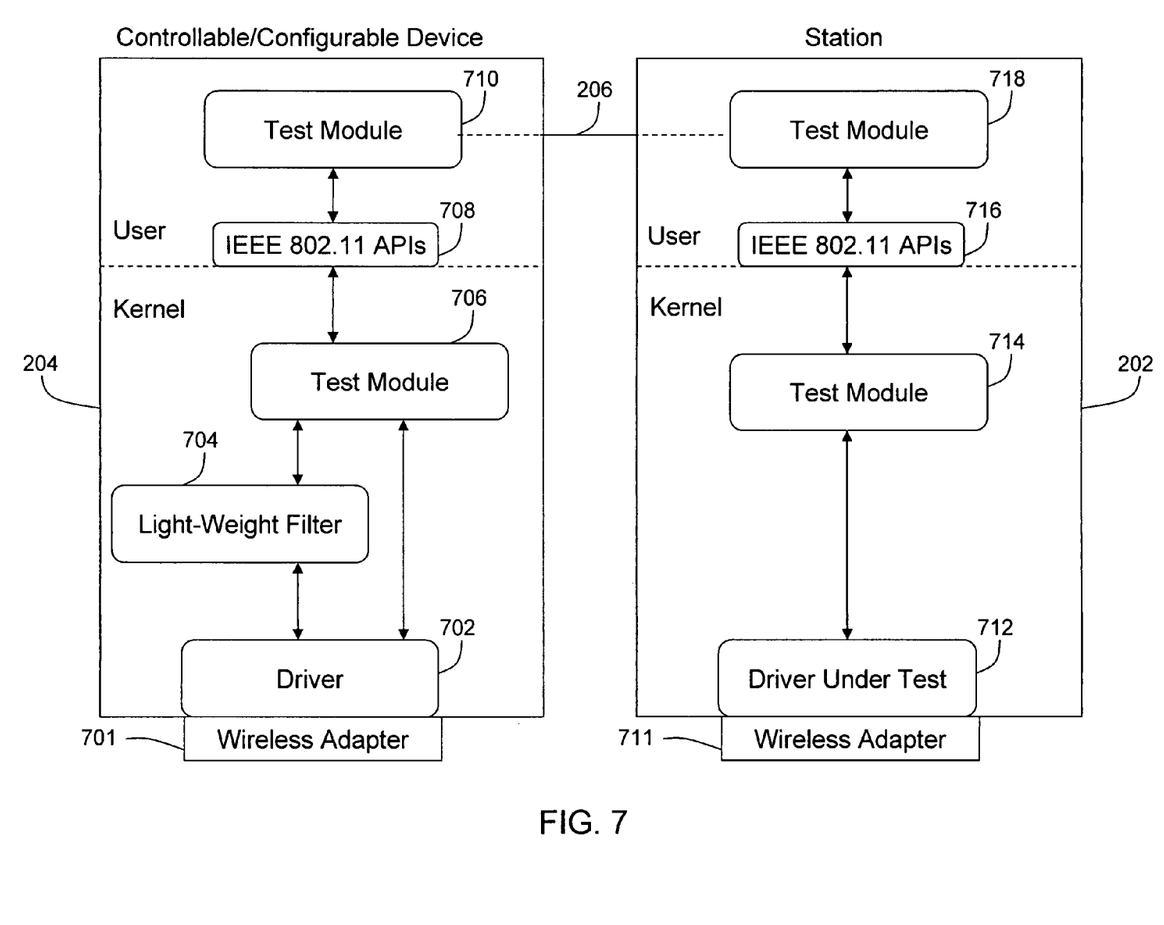
FIG. 7 is a block diagram showing an illustrative implementation of a configurable device and station in accordance with some embodiments of the invention.

It should be appreciated that the above-described embodiments of the invention can be implemented in numerous ways, and are not limited to any particular implementation technique. By way of example, one possible implementation is illustrated in FIG. 7, which illustrates a number of software components that can be employed to implement aspects of the invention discussed above. Although particular relationships between software components are illustrated in FIG. 7, the invention is not limited to any particular number, type or arrangement of software components, as numerous other configurations are possible. For example, functions that are described as being performed by a particular component need not necessarily be performed by that component, and could be performed by any other suitable component.

In the embodiment illustrated in FIG. 7, software components may run on both station 202 and device 204. Device 204 may include a driver 702, a light-weight filter 704 and a test module 706 that runs in the kernel, and 802.11 APIs 708 and a test module 710 that run in user mode. The functions of these components are described below.

Driver 702 may be an IEEE standard 802.11 miniport driver configured to communicate with a wireless network adapter 701 and handle the transmission and reception of data packets. Any suitable wireless network adapter 701 may be used, an example of which is a wireless network adapter available from RealTek. Of course, device 204 may have another driver instead of or in addition to a driver suitable for communicating with a RealTek network adapter, as the invention is not limited in this respect.

Light-weight filter 704 may be a software module that communicates with the driver 702 and the test module 706 and performs functions such as handling an association request sent by the station 202 and responding to the station's request to communicate. Light-weight filter 704 may also handle encryption for communications with the station 202. Performing these functions in light-weight filter 704, rather than in driver 702, may enable greater control over communications with station 202 because light-weight filter 704 may be configurable via an operating system running on device 204, whereas driver 702 may not be configurable via the operating system. However the invention is not limited in this respect, and driver 702 may communicate directly with the test module 706.

Test module 706 may be a software module that communicates with driver 702, light-weight filter 704, and IEEE 802.11 APIs 708. Test module 706 may handle various functions to control behavior of the device 204 in ways that enable the station 202 to be tested, including communicating in accordance with the protocols (e.g., IEEE standard 802.11) supported by the driver 702 and the wireless network adapter 701. As discussed above, in accordance with some embodiments of the invention, test module 706 can send communications that do not comply with the communication standard (e.g., IEEE standard 802.11), e.g., sending bad packets and/or forcing a denial of a connection request sent from station 202.

The IEEE 802.11 APIs 708 may be standard application program interfaces for handling communications according to IEEE standard 802.11, or any other suitable APIs.

Test module 710 may be a software module that communicates with test module 706 via IEEE 802.11 APIs 708. Test module 710 may perform high-level functions such as controlling the test of the station 202, enabling and disabling wireless communications and sending a particular number of packets. Test module 710 may be configured to handle communications sent and/or received via control channel 206.

Station 202 includes a driver under test 712 and a test module 714 that may run in the kernel, and IEEE 802.11 APIs 716 and a test module 718 that may run in user mode.

Driver under test 712 may be a software module that is to be evaluated. In one embodiment, driver under test 712 may be an 802.11 miniport driver configured to communicate with a wireless network adapter and handle the transmission and reception of data packets in accordance with the IEEE 802.11 protocol, or any other suitable protocol. Driver under test 712 may communicate with test module 714.

Test module 714 may be a software module that performs functions such as recording the response of driver under test 712, collecting statistics relative to the performance of driver under test 712, and/or other evaluation functions. In some embodiments, test module 714 may communicate with test module 718 via IEEE 802.11 APIs 716.

Test module 718 may be a software module that controls the test procedure. For example, test module 718 may control device 204 via control channel 206. Test module 718 may control the timing of the tests and the types of tests that are performed. Test module 718 may perform evaluation functions such as generating a report on the performance of driver under test 712, evaluating the performance based on one or more performance criteria and/or displaying the results of the evaluation for a user.

Particular implementation details of computer systems that may execute aspects of the invention will now be described. These implementation details are provided by way of example only, and the invention is not limited to any particular implementation.

Figure 8:
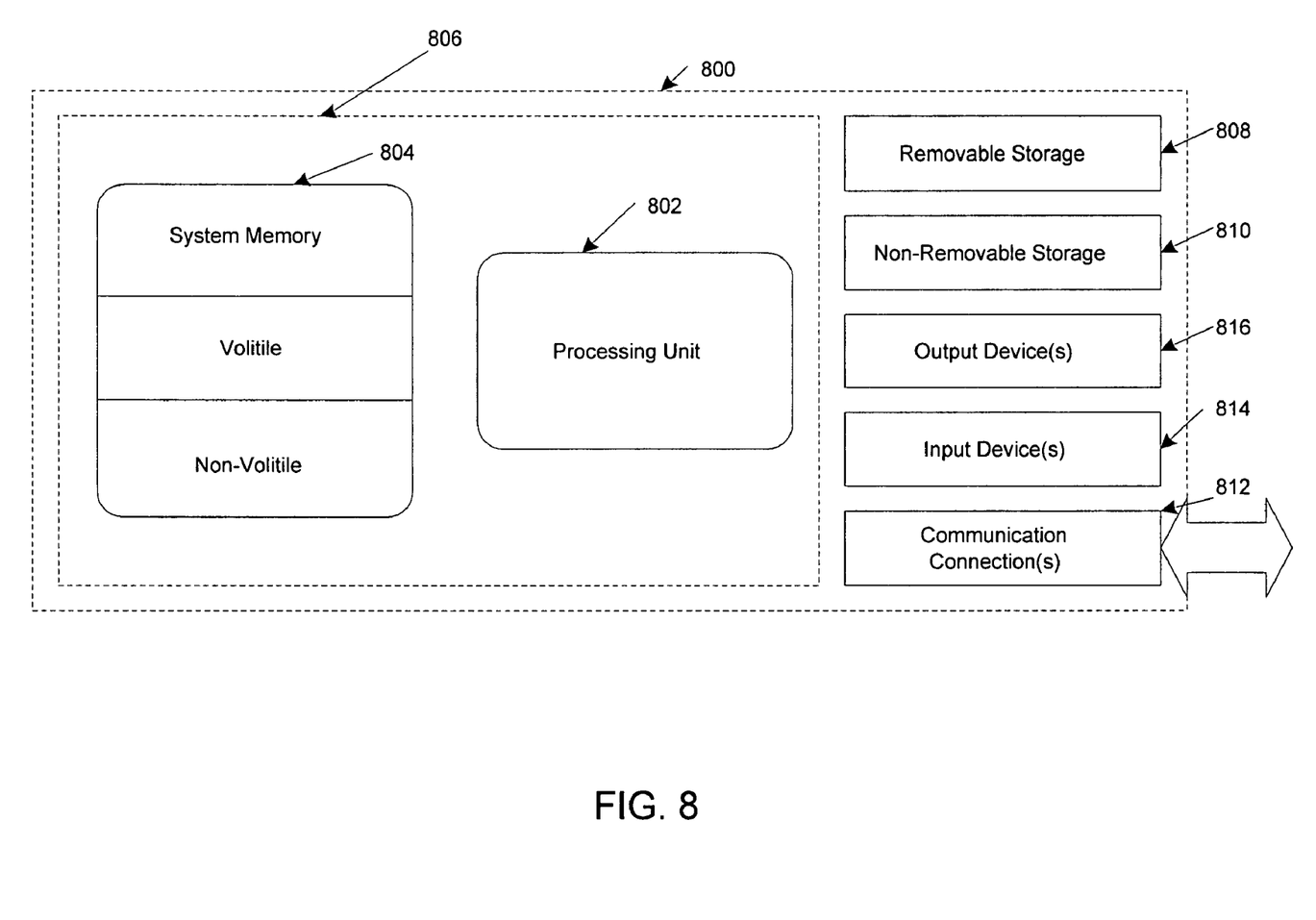
FIG. 8 is a block diagram showing an illustrative implementation of a computing system in accordance with some embodiments of the invention.

With reference to FIG. 8, an exemplary system for implementing embodiments of the invention includes a computing device, such as computing device 800, which may be a device suitable to function as device 204, device 502 and/or station 202. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality.

Device 800 may include at least some form of computer readable media. Computer readable media can be any available media that can be accessed by device 800. By way of example, and not limitation, computer readable media may comprise computer storage media and communication media. For example, device 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 800 may also have input device(s) 814 such as keyboard, mouse, pen, voice input device, touch input device, etc. Output device(s) 816 such as a display, speakers, printer, etc. may also be included. All these devices are well know in the art and need not be discussed at length here.

Control channel 206 may include any suitable type of network such a local area network (LAN), wide area network (WAN), intranet, Internet or any combination thereof. Device 204, device 502 and/or station 202 may be coupled via control channel 206 through one or more servers, routers, proxies, gateways, network address translation devices or any suitable combination thereof.

It should be appreciated that the invention is not limited to executing on any particular system or group of systems. For example, embodiments of the invention may run on one device or on a combination of devices. Also, it should be appreciated that the invention is not limited to any particular architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method of evaluating a station configured to communicate with at least one access point, the method comprising acts of:
    (A) controlling a first device to communicate wirelessly with the station by transmitting a wireless signal encoded with a message in accordance with a wireless communication protocol, the wireless signal having a first wireless signal strength;
    (B) controlling the first device, via software, to reduce the first wireless signal strength; and (C) evaluating whether the station performs at least one action in response to the station receiving the wireless signal that was transmitted with reduced strength.

2. The method of claim 1, wherein the station and/or the first device comprises a wireless network adapter that communicates wirelessly according to the wireless communication protocol.

3. The method of claim 1, wherein the wireless communication protocol comprises IEEE standard 802.11.

4. The method of claim 1, wherein the first device functions as an access point.

5. The method of claim 1, wherein the act (A) and/or the act (B) comprises controlling the first device via at least one command issued from the station.

6. The method of claim 5, wherein the act (A) and/or the act (B) comprises sending the at least one command from the station to the first device via a wired connection.

7. The method of claim 1, wherein the act (A) and/or the act (B) comprises sending at least one command from the station to the first device via a wired connection.

8. The method of claim 7, wherein the station comprises:
a wireless network adapter; and
at least one driver that is a software module configured to send and receive communications via the wireless network adapter;
wherein the act (C) comprises evaluating a response of the driver to the reduction in the first wireless signal strength.

9. The method of claim 1, further comprising an act of:
(D) transmitting a wireless signal by a second device and receiving the wireless signal by the station;
wherein the act (B) comprises reducing the first wireless signal strength so that the wireless signal received by the station from the first device transitions from being stronger than the wireless signal received by the station from the second device to being weaker than the wireless signal received by the station from the second device.

10. The method of claim 9, wherein the act (C) comprises evaluating an ability of the station to switch from communicating wirelessly with the first device to communicating wirelessly with the second device in response to the act (B).

11. At least one computer-readable medium having computer-executable instructions encoded thereon that, when executed, perform acts of a method of evaluating a station configured to communicate with at least one access point, the method comprising acts of:
(A) controlling a first device to communicate wirelessly with the station by transmitting a wireless signal encoded with a message in accordance with a wireless communication protocol, the wireless signal having a first wireless signal strength;
(B) controlling the first device, via software, to reduce the first wireless signal strength; and
(C) evaluating whether the station performs at least one action in response to the station receiving the wireless signal that was transmitted with reduced strength.

12. The at least one computer-readable medium of claim 11, wherein the station and/or the first device comprises a wireless network adapter.

13. The at least one computer-readable medium of claim 11, wherein the first device communicates wirelessly with the station according to IEEE standard 802.11.

14. The at least one computer-readable medium of claim 11, wherein the first device functions as an access point.

15. The at least one computer-readable medium of claim 11, wherein the act (A) and/or the act (B) comprises controlling the first device via at least one command issued from the station.

16. The at least one computer-readable medium of claim 15, wherein the act (A) and/or the act (B) comprises sending the at least one command from the station to the first device via a wired connection.

17. The at least one computer-readable medium of claim 11, wherein the act (A) and/or the act (B) comprises sending at least one command from the station to the first device via a wired connection.

18. The at least one computer-readable medium of claim 17, wherein the station comprises:
a wireless network adapter; and
at least one driver that is a software module configured to send and receive communications via the wireless network adapter;
wherein the act (C) comprises evaluating a response of the driver to the reduction in the first wireless signal strength.

19. The at least one computer-readable medium of claim 11, wherein the method further comprises an act of:
(D) transmitting a wireless signal by a second device and receiving the wireless signal by the station;
wherein the act (B) comprises reducing the first wireless signal strength so that the wireless signal received by the station from the first device transitions from being stronger than the wireless signal received by the station from the second device to being weaker than the wireless signal received by the station from the second device.

20. The at least one computer-readable medium of claim 19, wherein the act (C) comprises evaluating an ability of the station to switch from communicating wirelessly with the first device to communicating wirelessly with the second device in response to the act (B).

* * * * *